Aug. 10, 1926.　　　　　　　　　　　　　　　　　1,595,277
O. WITTEL
MOTION PICTURE CAMERA
Filed Nov. 18, 1924
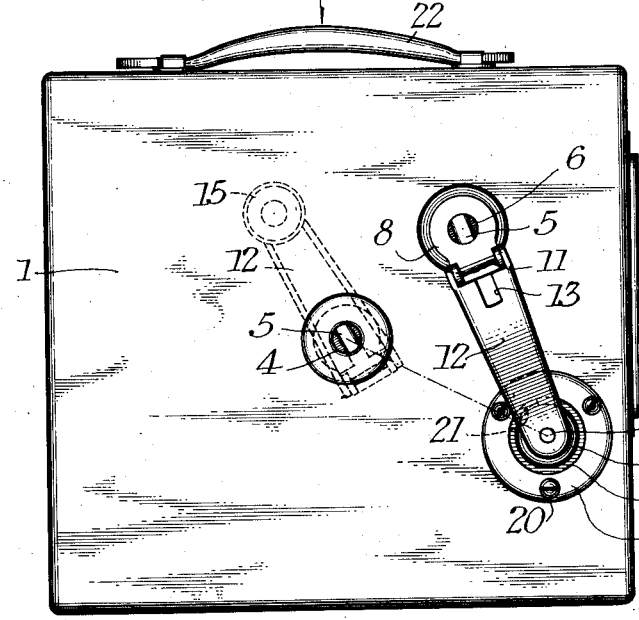
FIG_1_
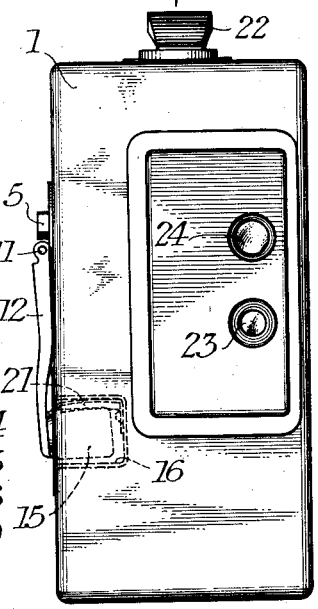
FIG_2_
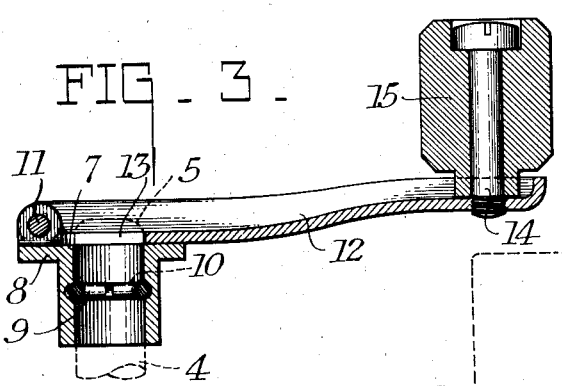
FIG_3_
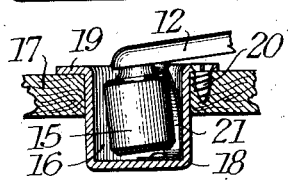
FIG_6_
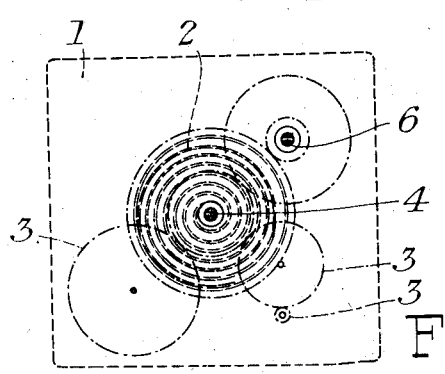
FIG_5_
FIG_4_
INVENTOR.
Otto Wittel,
BY R. L. Stinchfield
N. M. Perrin
ATTORNEYS.

Patented Aug. 10, 1926.

1,595,277

UNITED STATES PATENT OFFICE.

OTTO WITTEL, OF ROCHESTER, NEW YORK, ASSIGNOR TO EASTMAN KODAK COMPANY, OF ROCHESTER, NEW YORK, A CORPORATION OF NEW YORK.

MOTION-PICTURE CAMERA.

Application filed November 18, 1924. Serial No. 750,600.

My invention relates to improvements in motion picture apparatus.

It is necessary in certain types of motion picture cameras to use a winding or cranking handle on different shafts for different purposes. Some cameras are designed for advancing the film at different rates of speed and shafts connected to the mechanisms by different gear ratios are employed. Other cameras have spring motors and may be driven either from the motor or from a manual crank. In such a case the motor must have a shaft for winding.

One object of my invention is to provide a single removable handle which may be used with either shaft and be readily rendered operative or inoperative. Another object is to furnish a convenient storage position for such handle when not in use, without disconnecting it from whichever of the shafts it may be upon. Other objects and features of my invention will be apparent from the following description in connection with the drawings and claims appended thereto.

In the drawings wherein the same reference characters denote the same parts throughout,—

Fig. 1 is a side elevation of a camera embodying one form of my invention;

Fig. 2 is a front elevation thereof;

Fig. 3 is a section of my improved handle applied to a shaft, which is shown in dotted lines;

Fig. 4 is a diagrammatic view showing the relation of certain parts of the camera mechanism;

Fig. 5 is a similar diagram of a modification;

Fig. 6 is a fragmentary section showing the socket and the end of the handle in position therein.

A simple embodiment of my invention in part includes a camera in a box-like casing 1, in which is a spring motor 2 furnishing power through suitable gears 3 to the film-driving mechanism, which are so connected to the actual film-engaging mechanism, not shown, as to advance the film through the cameras. Included in the driving train is a shaft 4 which protrudes through one side wall 17 of the casing and has upon the ends thereof an irregular conformation shown herein as a ridge 5. The motor 2 is wound by suitable mechanism driven from shaft 6 parallel to shaft 4 and which protrudes from the same side wall of the casing, and having on its end a ridge 5 similar to that upon the end of shaft 4. If shaft 4 is rotated the film-advancing mechanism, which is directly connected thereto, will be operated. Shaft 6 is normally used to wind the spring. Both shafts are, therefore, so connected with the film-driving mechanism as to effect its operation directly or indirectly.

A removable handle 7 is used with both shafts. This comprises two parts, one of which 8 fits loosely over the end of either shaft and carries a resilient wire loop 9, which snaps into a suitable groove in the shaft, shown at 10 in Fig. 3. This normally keeps the handle from accidental displacement, but permits it to be snapped on and off and also permits it to rotate freely. Hinged at 11 to part 8 is the second part 12 having an opening 13 of irregular conformation to fit over the projection 5 on the end of the shaft. These parts 5 and 13 constitute complementary clutch members. On the end of handle 12 is carried a bolt 14 with a freely rotating finger piece 15, by which the handle is grasped. When the handle is not being used, it can be turned upon hinge 11 and the finger piece 15 may then be seated in a socket 16 formed in the side wall 17 of the casing. The socket is located equidistantly from the two shafts, the distance being the same as the length of the handle when in unfolded or inoperative position. Whichever shaft the handle may be on, it can be readily seated in the same socket. The socket consists of a metal body 18 having a flange 19 secured to the wall 17 by screws 20. Secured within the socket is a resilient latch member 21 for holding the finger piece against accidental displacement.

In certain forms of cameras analogous shafts 4' and 6' may bear the same relation to a similar handle, these shafts being part of the train of mechanism directly connected to the film pulldown apparatus and permitting the driving of the film at two different speeds by manually turning these shafts. The camera has the usual carrying handle 22, objective 23 and finder lens 24, and other camera elements not constituting part of this invention.

It is to be understood that numerous modifications of this invention are possible and one such embodiment is to be found in the application of Edwin C. Fritts for motion picture apparatus, Serial No. 733,653, filed Aug. 22, 1924, in which are also more fully disclosed certain parts of the camera mechanism. I consider as within the scope of my invention all such modifications and equivalents as fall within the terms of the appended claims.

Having thus described my invention, what I claim as new and desire to secure by Letters Patent is:

1. In a motion picture apparatus having mechanism for advancing film, a shaft connected to said mechanism and having a clutch member at its end, and a folding handle comprising two hinged parts one of which is rotatably mounted on the shaft and the other of which has a clutch member adapted to cooperate with the first mentioned clutch member when the handle is folded.

2. In a motion picture camera having a casing and mechanism therein for advancing film, a shaft connected to said mechanism and having a clutch member at its end, a folding handle comprising two hinged parts, one of which is rotatably mounted on the shaft and the other of which has a clutch member adapted to cooperate with the first mentioned clutch member when the handle is folded, and a protruding finger piece on the end of the handle, there being in the casing a socket in which the finger piece may be seated when the handle is unfolded.

3. In a motion picture apparatus having mechanism therein for advancing film, two shafts connected to said mechanism, a handle adapted to be removably positioned on either shaft, said handle having a finger piece foldable when on either shaft so as to be directed toward said apparatus and engaging means equidistant from said shafts and in which the finger piece may be seated when the handle is positioned on either shaft.

4. In a motion picture apparatus having a casing and mechanism therein for advancing a film, two shafts connected to said mechanism, a handle adapted to be removably positioned on either shaft, said handle having a finger piece foldable when the handle is on either shaft so as to be directed toward the casing, said casing having a socket equidistant from said shafts and in which the finger piece may be seated when the handle is positioned on either shaft.

5. In a motion picture apparatus having a casing and mechanism therein for advancing film, two parallel shafts connected to said mechanism and protruding through a common wall of said casing, a folding handle with a protruding finger piece adapted to be removably positioned on either of said shafts and having on either shaft a folded position in which it operatively engages said shaft, and an unfolded inoperative position, there being in the wall a socket equidistant from said shafts and in which the finger piece may be seated when the handle is in unfolded position on either shaft.

6. In motion picture apparatus having mechanism for advancing film, a shaft connected to said mechanism, for driving the same, a motor connected to said mechanism for driving the same, a second shaft connected to the motor for winding the same, a handle adapted to be removably positioned on either shaft for driving the mechanism directly or for winding the motor, said handle having a finger piece foldable, when the handle is on either shaft, so as to be directed toward the apparatus end engaging means equidistant from said shafts and in which the finger piece may be seated when the handle is positioned on either shaft.

7. In a motion picture camera comprising a casing and mechanism therein for advancing film, a shaft protruding through a wall of the casing and connected to said mechanism, a motor connected to said mechanism for driving the same, a second shaft connected to the motor for winding the same and protruding through the same wall as the first shaft and parallel thereto, a folding handle with a protruding finger piece adapted to be removably positioned on either of said shafts, and having on either shaft a folded position in which it operatively engages said shaft, and an unfolded inoperative position, there being in the wall a socket equidistant from said shafts and in which the finger piece may be seated when the handle is in unfolded position on either shaft.

8. In a motion picture apparatus having a casing and mechanism therein for advancing film, two parallel shafts connected to said mechanism and protruding through a common wall of said casing, a folding handle with a protruding finger piece adapted to be removably positioned on either of said shafts and having on either shaft a folded position in which it operatively engages said shaft, and an unfolded inoperative position, there being in the wall a socket equidistant from said shafts and in which the finger piece may be seated when the handle is in unfolded position on either shaft, the shaft upon which the handle is located being free to turn with respect to the handle when the finger piece is seated in the socket.

9. In a motion picture camera comprising a casing and mechanism therein for advancing film, a shaft protruding through a wall of the casing and connected to said mechanism, a motor connected to said mechanism for driving the same, a second shaft connected to the motor for winding the same and protruding through the same wall as the first shaft and parallel thereto, a folding handle with a protruding finger piece adapted to be removably positioned on either of said shafts, and having on either shaft a folded position in which it operatively engages said shaft, and an unfolded inoperative position, there being in the wall a socket equidistant from said shafts and in which the finger piece may be seated when the handle is in unfolded position on either shaft, the shaft upon which the handle is located being free to turn with respect to the handle when the finger piece is seated in the socket.

Signed at Rochester, New York, this 13th day of November, 1924.

OTTO WITTEL.